United States Patent Office 3,824,311
Patented July 16, 1974

3,824,311
METHOD OF TREATMENT
Lewis R. Mandel, Edison, N.J., assignor to Merck & Co., Inc., Rahway, N.J.
No Drawing. Application Feb. 4, 1972, Ser. No. 223,721, now Patent No. 3,749,781, dated July 31, 1973, which is a continuation-in-part of abandoned application Ser. No. 80,176, Oct. 12, 1970. Divided and this application Apr. 20, 1973, Ser. No. 353,043
Int. Cl. A61k 27/00
U.S. Cl. 424—267
1 Claim

ABSTRACT OF THE DISCLOSURE

A composition for and a method of inhibiting indoleamine-N-methyl transferase comprising the administration to a host of a therapeutically effective amount of a compound selected from the group consisting of 2,3-dimercapto - quinoxaline, 2,3,4,6,7,8-hexahydropyrrolo-[1,2-a]pyrimidine, mono-lower alkyl derivatives of 2,3,4,6,7,8 - hexahydropyrrolo - [1,2-a]pyrimidine, quinuclidine, 1 - pyrrolidinecarboxamidine, 3,4,6,7,8,9-hexahydro - 2H-pyrido[1,2 - a]pyrimidine, 2,3,4,6,7,8,9,10 - octahydropyrimido[1,2 - a]azepine, 1-methyl-2-*trans*-styryl - 1,4,5,6-tetrahydropyrimidine, (2,4 - dihydroxy-5-pyrimidyl) - disulfide, 2,3-dimethoxy-5-methyl - 6 - bromobenzoquinone and the pharmaceutically acceptable salts thereof.

This is a division of application Ser. No. 223,721, filed Feb. 4, 1972 now Pat. No. 3,749,781,issued July 31, 1973, which application is a continuation-in-part of U.S. Ser. No. 80,176, filed Oct. 12, 1970, now abandoned.

The present invention relates to a novel and useful pharmaceutical composition and a method of treatment. More specifically, it relates to a composition and method for inhibiting indoleamine-N-methyl transferase by the administration of various chemicals.

N,N - dimethyl indoleamines are generally psychotomimetic agents and some of these (e.g. dimethyl serotonin and dimethyl tryptamine) are reported to be produced in excessive amounts by patients with mental aberrations (i.e. schizophrenia). Indoleamine - N - methyl transferase catalyzes the methylation steps in the biosynthesis of these compounds. Accordingly, inhibitors of this enzyme are of therapeutic value in the management of the body chemistry of patients having mental aberrations and it alleviates some symptoms of the disease.

It is an object of the present invention to provide a composition which inhibits indoleamine-N-methyl transferase. Another object is to provide a method of inhibiting transferase with a group of relatively non-toxic materials. Other objects will become apparent as the description of the invention proceeds.

These objects are accomplished by the present invention which provides a method of inhibiting indoleamne-N-methyl transferase comprising the administration to a host of a therapeutically effective amount of a compound selected from the group consisting of 2,3-dimercaptoquinoxaline, 2,3,4,6,7,8 - hexahydropyrrolo[1,2 - a]pyrimidine, mono-lower alkyl derivatives of 2,3,4,6,7,8-hexahydropyrrolo[1,2-a]pyrimidine, quinuclidine, 1-pyrrolidinecarboxamidine, 3,4,6,7,8,9-hexahydro-2H-pyrido[1,2 - a]pyrimidine, 2,3,4,6,7,8,9,10-octahydropyrimido[1,2-a]azepine, 1-methyl-2-*trans*-styryl-1,4,5,6-tetrahydropyrimidine, (2,4-dihydroxy-5-pyrimidyl)disulfide, 2,3-dimethoxy-5-methyl-6-bromobenzoquinone and the pharmaceutically acceptable salts thereof.

In a preferred embodiment of the present invention, the compound is 2,3,4,6,7,8-hexahydropyrrolo[1,2-a]pyrimidine, mono-lower alkyl derivatives of 2,3,4,6,7,8-hexahydropyrrolo[1,2 - a]pyrimidine, quinuclidine, 3,4,6, 7,8,9-hexahydro - 2H - pyrido[1,2 - a]pyrimidine or 2,3,4, 6,7,8,9,10-octahydropyrimido[1,2-a]azepine.

The compounds employed in the present invention have the following structural formula:

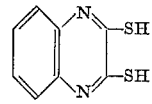

2,3-Dimercaptoquinoxaline

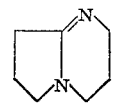

2,3,4,6,7,8-Hexahydropyrrolo[1,2-a]pyrimidine

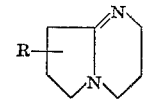

wherein R=lower alkyl (1–6 C atoms).

Mono-lower alkyl (1 to 6 carbon atoms) derivatives of 2,3,4,6,7,8-hexahydropyrrolo[1,2-a]pyrimidine such as

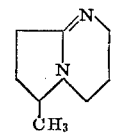

6-Methyl-2,3,4,6,7,8-hexahydropyrrolo[1,2-a]pyrimidine
and

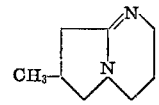

7-Methyl-2,3,4,6,7,8-hexahydropyrrolo[1,2-a]pyrimidine

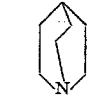

Quinuclidine

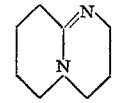

1-Pyrrolidinecarboxamidine

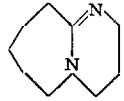

3,4,6,7,8,9-Hexahydro-2H-pyrido[1,2-a]pyrimidine

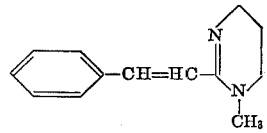

2,3,4,5,6,7,8,9,10-Octahydropyrimido[1,2–a]azepine

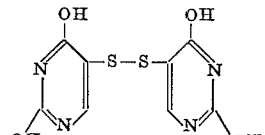

1-Methyl-2-*trans*-styryl-1,4,5,6-tetrahydropyrimidine (2,4-Dihydroxy-5-pyrimidyl)disulfide

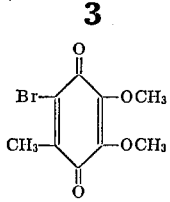

2,3-Dimethoxy-5-methyl-6-bromobenzoquinone

The compounds useful in the composition and method of treatment of this invention are known in the art, available commercially or may be prepared by well known prior art methods as, for example, by the procedures illustrated in Chem. Abstracts, Volume 52 (1958), 18428 and 18429; Chem. Abstracts, Volume 54 (1960), 14278; Journal of Chemical Society (1954), pp. 4206–4210; Journal of the American Chemical Society, Volume 77 (1955), pp. 960–963; Journal of the American Chemical Society, Volume 78 (1956), pp. 401–402; Chem. Abstracts, Volume 69 (1968), 67320; Journal of Medicinal Chemistry, Volume 12 (1969), pp. 1066–1079 or Biochimica et Biophysica, Volume 52 (1969), pp. 119–129.

In general the daily dose can be from about 0.005 mg./kg. to about 300 mg./kg. per day and preferably from 0.05 mg./kg. to 100 mg./kg. per day, bearing in mind, of course, that in selecting the appropriate dosage in any specific case, consideration must be given to the patient's weight, general health, metabolism, age and other factors which influence response to the drug.

Another embodiment of this inventon is the provision of pharmaceutical compositions in dosage unit form which comprise from about 1 mg. to 500 mg. of a compound of the above formulae.

The pharmaceutical compositions may be in a form suitable for oral use, for example, as tablets, solutions, aqueous or oily suspensions, dispersible powders or granules, emulsions, hard or soft capsules, or syrups or elixirs. Compositions intended for oral use may be prepared according to any method known to the art for the manufacture of pharmaceutical compositions and such compositions may contain one or more agents selected from the group consisting of sweetening agents, flavoring agents, coloring agents and preserving agents in order to provide a pharmaceutically elegant and palatable preparation. Tablets contain the active ingredient in admixture with non-toxic pharmaceutically acceptable excipients which are suitable for manufacture of tablets. These excipients may be, for example, inert diluents, for example calcium carbonate, sodium carbonate, lactose, calcium phosphate or sodium phosphate; granulating and disintegrating agents, for example maize starch or alginic acid; binding agents, for example starch, gelatin or acacia, and lubricating agents, for example magnesium stearate, stearic acid or talc. The tablets may be uncoated or they may be coated by known techniques to delay disintegration and adsorption in the gastro-intestinal tract and thereby provide a sustained action over a longer period.

Formulations for oral use may also be presented as hard gelatin capsules wherein the active ingredient is mixed with an inert solid diluent, for example calcium carbonate, calcium phosphate or kaolin, or as soft gelatin capsules wherein the active ingredient is dissolved or mixed with an oil or aqueous medium, for example arachis oil, liquid paraffin, olive oil or water by itself.

Aqueous suspensions or solutions containing the active compound in admixture with excipients are suitable for the manufacture of aqueous suspensions. Such excipients are suspending agents, for example sodium carboxymethylcellulose, methylcellulose, hydroxypropylmethylcellulose, sodium alginate, polyvinylpyrrolidone, gum tragacanth and gum acacia; dispersing or wetting agents may be a naturally-occurring phosphatide, for example lecithin, or condensation products of an alkylene oxide with fatty acids, for example polyoxyethylene stearate, or condensation products of ethylene oxide with long chain aliphatic alcohols, for example heptadecaethyleneoxy-cetanol, or condensation products of ethylene oxide with partial esters derived from fatty acids and a hexitol, for example polyoxyethylene sorbitol mono-oleate, or condensation products of ethylene oxide with partial esters derived from fatty acids and hexitol anhydrides, for example polyoxyethylene sorbitan mono-oleate. The said aqueous suspensions may also contain one or more preservatives, for example ethyl or n-propyl, p-hydroxy benzoate, one or more coloring agents, one or more flavoring agents and one or more sweetening agents, such as sucrose, saccharin, or sodium or calcium cyclamate.

Oily suspensions may be formulated by suspending the active ingredient in a vegetable oil, for example arachis oil, olive oil, sesame oil or coconut oil, or in a mineral oil such as liquid paraffin. The oil suspensions may contain a thickening agent, for example beeswax, hard paraffin or cetyl alcohol. Sweetening agents, such as those set forth above, and flavoring agents may be added to provide a palatable oral preparation. These compositions may be preserved by the addition of an anti-oxidant such as ascorbic acid.

Dispersible powders and granules suitable for preparation of an aqueous suspension by the addition of water provide the active ingredient in admixture with a dispersing or wetting agent, suspending agent and one or more preservatives. Suitable dispersing or wetting agents and suspending agents are exemplified by those already mentioned above. Additional excipients, for example sweetening, flavoring and coloring agents, may also be present.

The pharmaceutical compositions of the invention may also be in the form of oil-in-water emulsions. The oily phase may be a vegetable oil, for example olive oil or arachis oils, or a mineral oil, for example liquid paraffin or mixtures of these. Suitable emulsifying agents may be naturally-occurring gums, for example gum acacia or gum tragacanth, naturally-occurring phosphatides, for example soya bean lecithin, and esters of partial esters derived from fatty acids and hexitol anhydrides, for example sorbitan mono-oleate, and condensation products of the said partial esters with ethylene oxide, for example polyoxyethylene sorbitan mono-oleate. The emulsions may also contain sweetening and flavoring agents.

Syrups and elixirs may be formulated with sweetening agents, for example glycerol, sorbitol or sucrose. Such formulations may also contain a demulcent, a preservative and flavoring and coloring agents. The pharmaceutical compositions may be in the form of a sterile injectable preparation, for example as a sterile injectable aqueous solution or suspension. This aqueous medium may be formulated according to the known art using those suitable dispersing or wetting agents and suspending agents which have been mentioned above. The sterile injectable preparation may also be a sterile injectable solution or suspension in a non-toxic parenterally-acceptable diluent or solvent, for example as a solution in 1:3-butane diol.

The pharmaceutical compositions may be tableted or otherwise formulated so that for every 100 parts by weight of the composition there are present between 5 and 95 parts by weight of the active ingredient and preferably between 25 and 85 parts by weight of the active ingredient. The dosage unit form will generally contain between about 0.05 mg. and about 500 mg. of the active ingredient of the formulae stated above.

From the foregoing formulation discussion it is apparent that the compositions of this invention can be administered orally or parenterally. The term parenteral as used herein includes subcutaneous injection, intravenous, intramuscular, or intrasternal injection or infusion techniques. In addition, the compounds can be given rectally as suppositories or topically with penetrants.

The following examples are presented to further illustrate the invention.

EXAMPLE 1

A mixture of 250 parts of 2,3-dimercaptoquinoxaline and 25 parts of lactose is granulated with suitable water, and to this is added 100 parts of maize starch. The mass is passed through a 16-mesh screen. The granules are dried at a temperature below 60° C. The dry granules are passed through a 16-mesh screen and mixed with 3.8 parts of magnesium stearate. They are then compressed into tablets suitable for oral administration.

EXAMPLE 2

A mixture of 50 parts of 2,3,4,6,7,8-hexahydropyrrolo-[1,2-a]pyrimidine, 3 parts of the calcium salts of lignin sulphonic acid, and 237 parts of water is ball-milled until the size of substantially all of the particles of benzyl ethyl sulfoxide is less than 10 microns. The suspension is diluted with a solution containing 3 parts of sodium carboxymethylcellulose and 0.9 part of the butyl ester of p-hydroxybenzoic acid in 300 parts of water. There is thus obtained an aqueous suspension suitable for oral administration for therapeutic purposes.

EXAMPLE 3

A mixture of 250 parts of the sulfuric acid salt of 1-pyrrolidinecarboxamidine, 200 parts of maize starch and 30 parts of alginic acid is mixed with a sufficient quantity of a 10% aqueous paste of maize starch, and granulated. The granules are dried in a current of warm air and the dry granules are then passed through a 16-mesh screen, mixed with 6 parts of magnesium stearate and compressed into tablet form to obtain tablets suitable for oral administration.

EXAMPLE 4

A mixture of 500 parts of (2,4-dihydroxy-5-pyrimidyl) disulfide, 60 parts of maze starch and 20 parts of gum acacia is granulated with a sufficient quantity of water. The mass is passed through a 12-mesh screen and the granules are dried in a current of warm air. The dry granules are passed through a 16-mesh screen, mixed with 5 parts of magnesium stearate and compressed into tablet form suitable for oral administration.

The 3,4,6,7,8,9-hexahydro-2H-pyrido[1,2-a]pyrimidine, 2,3 - dimethoxy - 5-methyl-6-bromobenzoquinone, quinuclidine and 1 - methyl - 2-*trans*-styryl-1,4,5,6-tetrahydropyrimidine compounds can be formulated in the same manner as the above compound.

The 6 - methyl - 2,3,4,6,7,8 - hexahydropyrrolo[1,2-a] pyrimidine and 7 - methyl-2,3,4,6,7,8-hexahydropyrrolo-[1,2-a]pyrimidine as the hydrogen fumate salts can be formulated in the same manner as the above compounds.

EXAMPLE 5

In a small cyclinder is measured 0.02 mls. of 2,3,4,6,7,8 - hexahydropyrrolo[1,2-a]pyrimidine which is dissolved in 1.0 ml. of phosphate buffered saline solution (standard p.b.s. solution). The resulting solution is suitable for injection and represents a dose of 20 mg.

EXAMPLE 6

The procedure of Example 4 is repeated employing the same parts by weight of 2,3,4,6,7,8,9,10-octahydropyrimido[1,2-a]azepine. The resulting tablets are suitable for oral administration.

Many other equivalent modifications of the invention would be apparent to those skilled in the art from a reading of the foregoing without a departure from the inventive concept.

I claim:
1. A method of inhibiting indoleamine-N-methyl transferase comprising the administration to a host of a therapeutically effective amount of the compound selected from the group consisting of quinuclidine or a pharmaceutically acceptable salt thereof.

References Cited

Merck Index, 7th ed., 1960 (p. 894).

STANLEY J. FRIEDMAN, Primary Examiner